United States Patent [19]
Kenyon et al.

[11] Patent Number: 5,477,929
[45] Date of Patent: Dec. 26, 1995

[54] GARDEN TOOL

[75] Inventors: Bert Kenyon, Santa Ana; Doug Ebbecke, El Toro, both of Calif.

[73] Assignee: Malco Products, Inc., Annandale, Minn.

[21] Appl. No.: 174,773

[22] Filed: Dec. 29, 1993

[51] Int. Cl.⁶ .................................................. A01B 1/22
[52] U.S. Cl. ...................... 172/372; 411/339; 403/379; 403/365; 172/371
[58] Field of Search .................. 172/372, 371, 172/753; 294/57; 403/379, 225, 221, 228, 226, 300, 301, 305, 365, 372; 411/908, 366, 338, 339

[56] References Cited

U.S. PATENT DOCUMENTS

| | | | |
|---|---|---|---|
| 168,780 | 10/1875 | Porter | 172/371 |
| 1,444,842 | 2/1923 | Lagerblade | 403/365 |
| 2,794,689 | 6/1957 | Rubrum | 403/301 |
| 2,991,096 | 7/1961 | Davidson | 403/365 |
| 3,353,852 | 11/1967 | Wood | 403/379 |
| 3,851,982 | 12/1974 | See | 403/379 |
| 4,033,243 | 7/1977 | Kirrish et al. | 411/338 |
| 4,492,129 | 1/1985 | Hasegawa | 403/372 |
| 4,759,670 | 7/1988 | Linder et al. | 411/339 |
| 5,069,586 | 12/1991 | Casey | 411/339 |
| 5,205,692 | 4/1993 | Kelbert et al. | 411/338 |

*Primary Examiner*—Terry Lee Melius
*Assistant Examiner*—Spencer Warnick
*Attorney, Agent, or Firm*—Blakely, Sokoloff, Taylor & Zafman

[57] ABSTRACT

A garden tool that has a tool member coupled to a hollow aluminum handle by a nylon spacer and a pair of threaded nylon rivets,

2 Claims, 1 Drawing Sheet

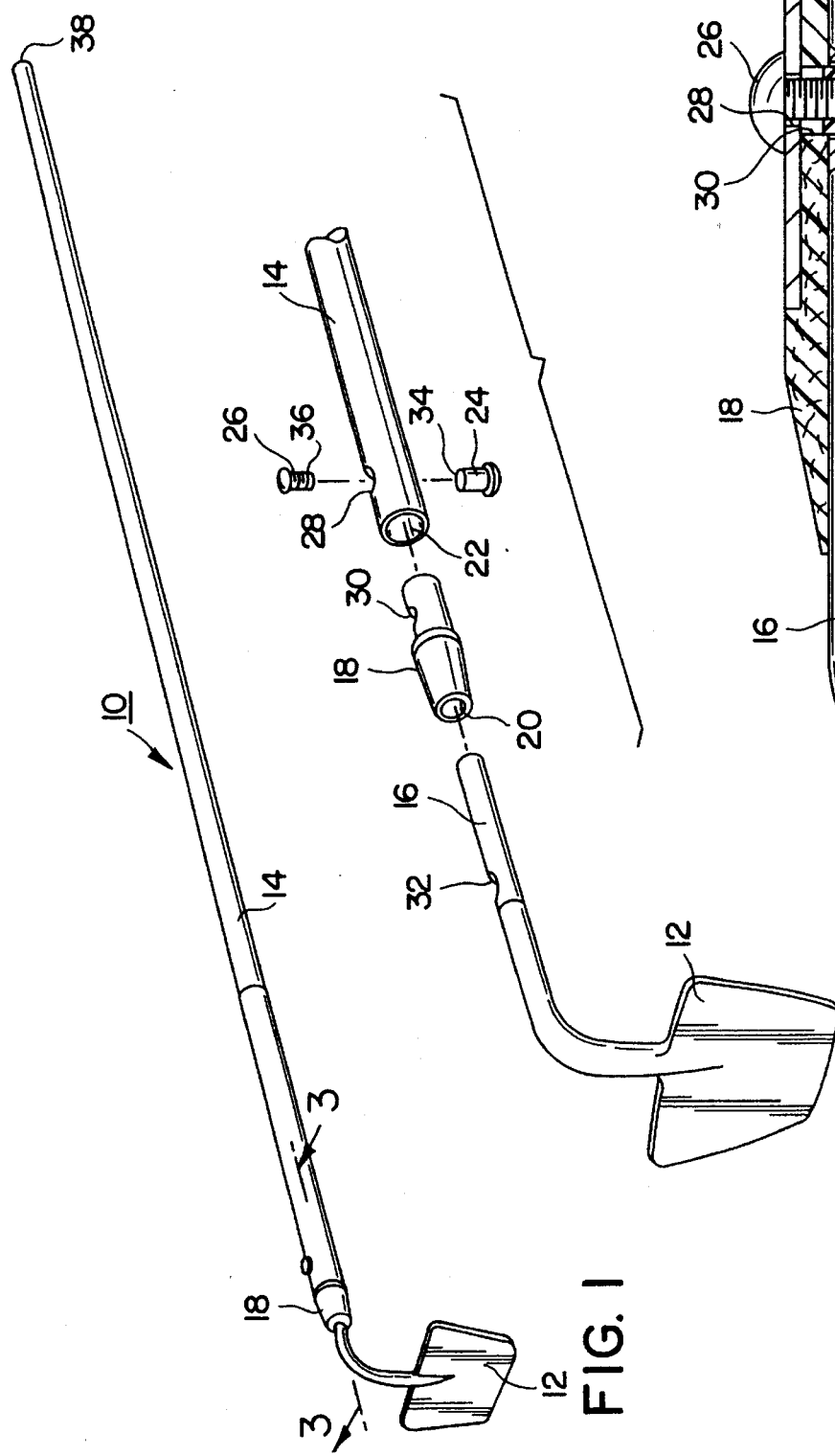
FIG. 1
FIG. 2
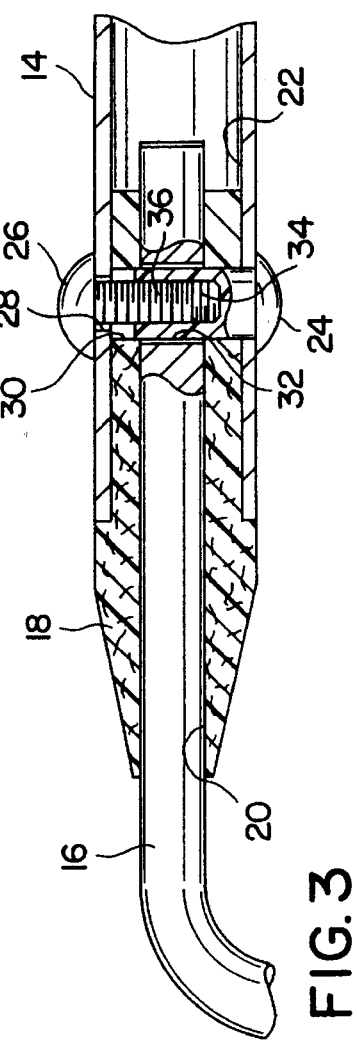
FIG. 3

GARDEN TOOL

BACKGROUND OF THE INVENTION

1. Field of the Invention

The present invention relates to a garden tool.

2. Description of Related Art

Garden tools are conventionally constructed with a wooden handle that is attached to a metal tool member such as a shovel or a hoe. The handle is typically placed into an opening in the tool member, wherein the end of the tool member is swagged onto the handle. Wooden handles have a tendency to break, especially when subjected to a large force. It would be desirable to have a garden tool that is constructed from a strong material such as a metal.

Shovels are frequently used to remove dirt in residential areas. Residential areas typically have electrical power lines buried in the ground. Use of a metal shovel may result in the possible shock or electrocution of the user. It would therefore be desirable to have a metal garden tool that would not transfer electricity to the user.

SUMMARY OF THE INVENTION

The present invention is a garden tool that has an aluminum handle coupled to a tool member by a spacer and a pair of threaded fastener members. The handle is hollow and is adapted to receive the end of the tool member and the spacer. The fasteners extend through apertures in the handle, spacer and tool member and are coupled together to fasten the tool to the handle. Both the spacer and the fasteners are constructed from a nonconductive material such as nylon to prevent electricity from flowing through the tool member and into the handle.

It is therefore an object of the present invention to provide a garden tool with a metal handle.

It is also an object of the present invention to provide a metal garden tool that will not transmit electricity to the user.

BRIEF DESCRIPTION OF THE DRAWINGS

The objects and advantages of the present invention will become more readily apparent to those ordinarily skilled in the art after reviewing the following detailed description and accompanying drawings, wherein:

FIG. 1 is a perspective view of a garden tool of the present invention;

FIG. 2 is a an exploded view of the garden tool of FIG. 1.

FIG. 3 is a cross-sectional view of the garden tool taken at line 3—3 of FIG. 1.

DETAILED DESCRIPTION OF THE INVENTION

Referring to the drawings more particularly by reference numbers, FIGS. 1–3 show a garden tool 10 of the present invention. The tool 10 includes a tool member 12 that is coupled to a hollow metal handle 14. The handle 14 is preferably constructed from an aluminum that is either anodized or painted. Although the tool member 12 shown is a hoe, it is to be understood that the tool member 12 may be a shovel or any other tool. The tool member 12 is typically constructed from a metal material and has an end 16 that is inserted into the hollow handle 14.

Located between the tool member 12 and the handle 14 is a spacer 18. The spacer 18 contains a bore 20 constructed to receive the end 16 of the tool member 12 and has an outer diameter that fits tightly within the internal channel 22 of the handle 14. The spacer 18 is preferably constructed from a nonconductive material such as nylon, which will prevent electricity from flowing through the metal tool member 12 and into the metal handle 14.

The tool member 12 is fastened to the handle 14 by a pair of threaded fasteners 24 and 26. The rivets extend through apertures 28–32 in the handle 14, spacer 18 and tool member 12, respectively. The first fastener 24 has a threaded bore 34 which mates with a corresponding threaded shaft 36 of the second rivet 26. The fasteners 24 and 26 are inserted into the apertures 2832 after the spacer 18 and tool member 12 pushed into the end of the handle 14. The rivets are typically installed by spinning and pressing the second fastener 26 into the first fastener 24. The fasteners are preferably constructed from a nonconductive material such as nylon, to prevent creating an electrical path between the tool member 12 and the handle 14. The tool member 12 can be replaced by pulling the fasteners apart and removing the tool member 12 from the handle 14. The garden tool of the present invention can thus be modified to have different types of tool members such as a shovel, etc. The end of the handle 14 may have an end cap 38. The combination of the aluminum handle coupled with the spacer and fasteners provide a strong rugged garden tool that will last significantly longer than conventional wooden handle tools of the prior art. The nonconductive spacer and rivets also prevent electricity from flowing through the length of the tool.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A garden tool, comprising:

a hollow aluminum handle having a pair of apertures;

a hollow spacer located within said handle, said spacer having a pair of apertures aligned with said apertures of said handle, said spacer being constructed from nylon;

a metal tool member having a first end within said spacer, said first end of said tool having a pair of apertures aligned with said apertures of said handle and said spacer;

a first fastener that is in contact with said handle and which extends through said apertures of said handle, said spacer and said tool member, said first fastener being constructed from nylon; and, a second fastener that is in contact with said handle and which extends through said apertures of said handle, said spacer and said tool member and is coupled to said first fastener, said second fastener being constructed from nylon, wherein said spacer and said fasteners electrically separate said metal tool member from said aluminum handle.

2. The garden tool as recited in claim 1, wherein said first fastener has a threaded bore that receives a threaded shaft of said second fastener.

* * * * *